United States Patent
Long (10) Patent No.: US 7,421,552 B2
(45) Date of Patent: Sep. 2, 2008

(54) TECHNIQUES FOR MANAGING DATA WITHIN A DATA STORAGE SYSTEM UTILIZING A FLASH-BASED MEMORY VAULT

(75) Inventor: Matthew Long, Uxbridge, MA (US)

(73) Assignee: EMC Corporation, Hopkinton, MA (US)

( * ) Notice: Subject to any disclaimer, the term of this patent is extended or adjusted under 35 U.S.C. 154(b) by 218 days.

(21) Appl. No.: 11/378,722

(22) Filed: Mar. 17, 2006

(65) Prior Publication Data

US 2007/0220227 A1    Sep. 20, 2007

(51) Int. Cl.
*G06F 12/00* (2006.01)

(52) U.S. Cl. ............... 711/162; 711/103; 711/117; 711/118; 711/154; 711/161

(58) Field of Classification Search ............... None
See application file for complete search history.

(56) References Cited

U.S. PATENT DOCUMENTS

| | | | |
|---|---|---|---|
| 5,677,890 A | 10/1997 | Liong et al. | ............ 365/229 |
| 5,799,200 A | 8/1998 | Brant et al. | |
| 6,295,577 B1 | 9/2001 | Anderson et al. | |
| 6,625,705 B2 * | 9/2003 | Yanai et al. | ............ 711/162 |
| 6,731,487 B2 * | 5/2004 | Fletcher et al. | ............ 361/93.2 |
| 6,898,727 B1 * | 5/2005 | Wang et al. | ............ 714/4 |
| 7,103,798 B2 | 9/2006 | Morita | |
| 2002/0152417 A1 | 10/2002 | Nguyen et al. | ............ 714/10 |
| 2003/0126494 A1 | 7/2003 | Strasser | ............ 714/6 |
| 2004/0103238 A1 | 5/2004 | Abraham et al. | ............ 711/102 |
| 2005/0117418 A1 * | 6/2005 | Jewell et al. | ............ 365/202 |
| 2005/0132178 A1 * | 6/2005 | Balasubramanian | ............ 713/1 |

OTHER PUBLICATIONS

"International Search Report" issued by the International Searching Authority for PCT/US2006/045552 dated May 8, 2007; 4 pages.

* cited by examiner

*Primary Examiner*—Reginald G. Bragdon
*Assistant Examiner*—Shawn X Gu
(74) *Attorney, Agent, or Firm*—BainwoodHuang (57) ABSTRACT

A technique for managing data within a data storage system involves performing data storage operations on behalf of a set of hosts (i.e., one or more hosts) using a volatile-memory storage cache and a set of magnetic disk drives while the data storage system is being powered by a primary power source (e.g., a main power feed). The technique further involves receiving a power failure signal (e.g., from a sensor) indicating that the data storage system is now being powered by a backup power source rather than by the primary power source (e.g., due to a loss of the main power feed, due to a failure of a power converter, etc.), and moving data from the volatile-memory storage cache of the data storage system to a flash-based memory vault of the data storage system in response to the power failure signal.

15 Claims, 7 Drawing Sheets

TECHNIQUES FOR MANAGING DATA WITHIN A DATA STORAGE SYSTEM UTILIZING A FLASH-BASED MEMORY VAULT

BACKGROUND

One conventional data storage system includes a storage processor, an array of magnetic disk drives and a backup power supply. The storage processor carries out a variety of data storage operations on behalf of an external host device (or simply host). In particular, the storage processor temporarily caches host data within its storage cache and, at certain times, de-stages that cached data onto the array of magnetic disk drives. If the data storage system is set up so that it acknowledges write requests from the host once the data reaches the storage cache rather than once the data reaches the array of magnetic disk drives, the host will enjoy shorter transaction latency.

Some data storage systems employ backup power supplies (e.g., uninterrupted power supplies) to prevent the loss of data from the storage caches in the event of power failures. For example, suppose that such a data storage system fails to receive power from a main power feed (e.g., power from the street) during operation. In such a situation, a set of backup power supplies provides reserve power to the storage processor and to the array of magnetic disk drives for a short period of time (e.g., 30 seconds). During this time, the storage processor writes the data from its storage cache onto a dedicated section of the magnetic disk drives called a "vault" so that any data which has not yet been properly de-staged is not lost. Once power from the main power feed returns, the storage processor loads the data from the magnetic disk drive vault back into the storage cache. At this point, the data storage system is capable of continuing normal operation.

It should be understood that some data storage systems include two storage processors for high availability (e.g., fault tolerant redundancy, higher throughput, etc.). Furthermore, some data storage systems position arrays of magnetic disk drives within enclosures which are separated from other enclosures holding the storage processors. These data storage systems typically rely on an external backup power supply for each storage processor and the array of magnetic disk drives that contain the vault. Typically the backup power supplies for the storage processors and the magnetic disk drives communicate with the various components of the data storage system through external cables in order to properly coordinate their operations.

SUMMARY

Unfortunately, there are deficiencies to the above-described conventional data storage systems which store data from storage caches to magnetic disk drive vaults during power failures. For example, magnetic disk drives typically consume a significant amount of power even during a short time duration (e.g., 30 seconds) since power is required for disk drive motors to spin, for fans to provide cooling, for actuators to move magnetic heads, and so on. Accordingly, the backup power supplies for arrays of magnetic disk drives are often large, costly and complex.

Additionally, the backup power supplies are external to the storage processor and disk array enclosures and as such require power and control cabling between the backup power supplies and the various enclosures. These external backup power supplies and the associated cabling impose relatively-high serviceability demands as well as increase the number of components which are susceptible to failure.

In contrast to the above-described conventional approaches to storing data from storage caches into magnetic disk drive vaults during power failures, an improved technique involves moving data within a data storage system from a storage cache into a flash-based memory vault (e.g., a module containing flash memory with no mechanical moving parts) in response to a power failure signal. Such operation alleviates the need to provide backup power to magnetic disk drives. Rather, data can be moved from the storage cache to the flash-based memory vault using a relatively-small backup power source (e.g., a battery that only powers a storage processor). Without the need for backup power to the magnetic disk drives, there is no burden of having to provide large, costly and complex backup power supplies and the associated external cabling for magnetic disk drives. That is, the magnetic disk drives can simply turn off as soon as primary power is lost. With the storage processor still running from a backup power source (e.g., a relatively small battery), the storage processor is capable of moving the contents of the storage cache to the flash-based memory vault thus preserving data integrity of the data storage system so that no data is ever lost.

One embodiment is directed to a technique for managing data within a data storage system. The technique involves performing data storage operations on behalf of a set of hosts (i.e., one or more hosts) using a volatile-memory storage cache and a set of magnetic disk drives while the data storage system is being powered by a primary power source (e.g., a main power feed). The technique further involves receiving a power failure signal (e.g., from a sensor, from a backup power source, etc.) indicating that the data storage system is now being powered by a backup power source rather than by the primary power source (e.g., due to a loss of the main power feed, due to a failure of a power converter, etc.), and moving data from the volatile-memory storage cache of the data storage system to a flash-based memory vault of the data storage system in response to the power failure signal.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

An improved technique involves moving data within a data storage system from a storage cache into a flash-based memory vault in response to a power failure signal. Such operation alleviates the need to provide backup power to magnetic disk drives. Rather, data can be moved from the storage cache to the flash-based memory vault using a relatively-small backup power source, e.g., a battery that only powers a storage processor. Without the need for backup power to the magnetic disk drives, there is no burden of having to provide large, costly and complex backup power supplies and the associated external cabling for magnetic disk drives. That is, the magnetic disk drives can simply turn off as soon as the primary power source is lost. With the storage processor still running from a backup power source (e.g., a dedicated battery), the storage processor is capable of moving the contents of the storage cache to the flash-based memory vault thus preserving data integrity of the data storage system so that no data is ever lost.

Figure 1:
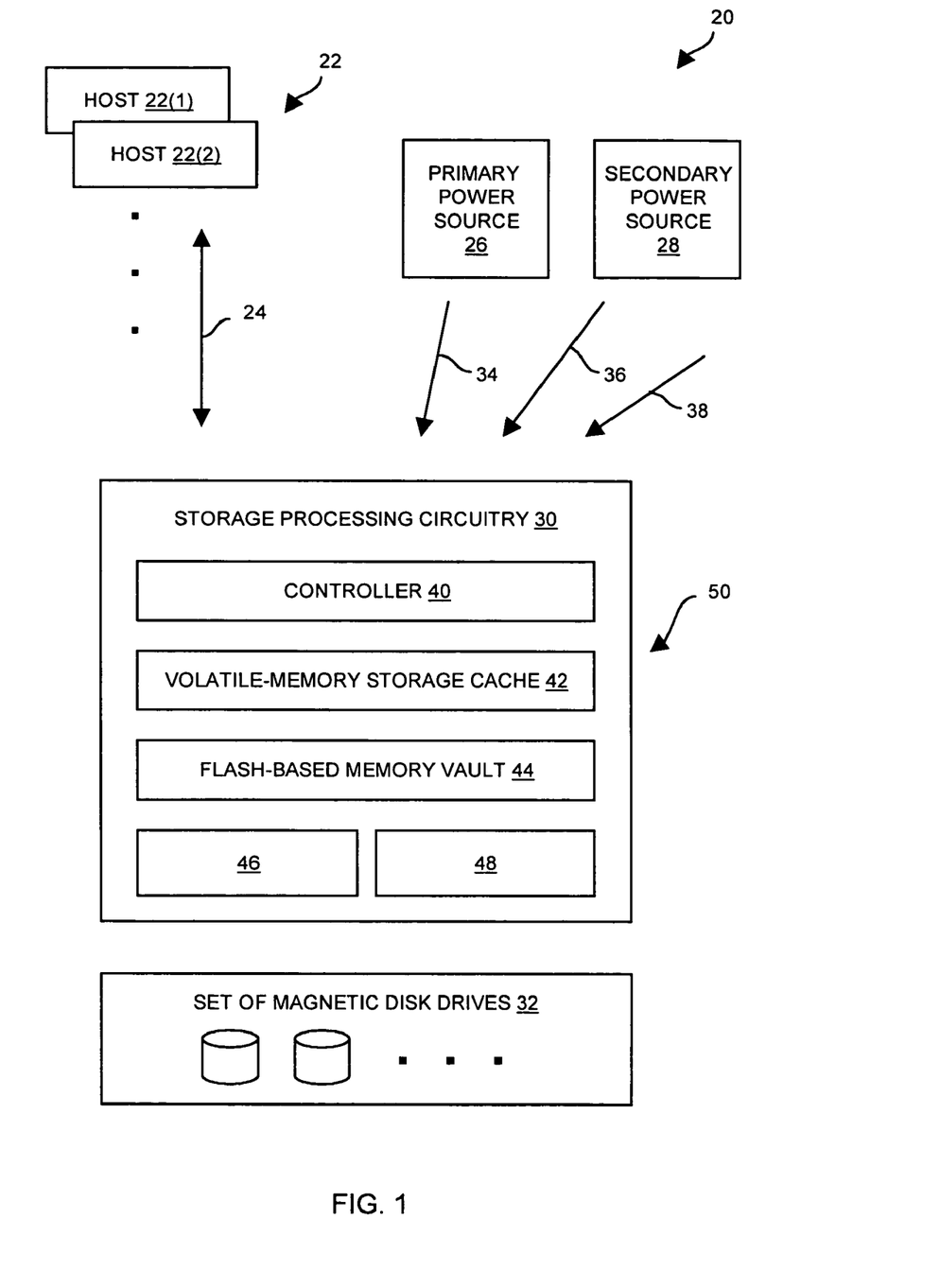
FIG. 1 is a block diagram of a data storage system which utilizes a flash-based memory vault.

FIG. 1 shows a data storage system 20 which is configured to manage data behalf of a set of hosts 22(1), 22(2), . . . (collectively, hosts 22). In particular, the data storage system 20 exchanges communications signals 24 with at least one host 22 to perform a variety of data storage operations (e.g., read, write, read-modify-write, etc.).

As shown in FIG. 1, the data storage system 20 includes a primary power source 26, a secondary power source 28, storage processing circuitry 30 and a set of magnetic disk drives 32 (i.e., one or more magnetic disk drives 32). The primary power source 26 (e.g., a set of power supplies which connects to an external main power feed) is configured to provide primary power 34 to the storage processing circuitry 30 under normal conditions. The secondary power source 28 (e.g., a set of batteries) is configured to provide backup power 36 to the storage processing circuitry 30 in the event of a loss of primary power 34.

As further shown in FIG. 1, the storage processing circuitry 30 is configured to receive a power failure signal 38 which indicates whether the storage processing circuitry 30 is running off of primary power 34 or backup power 36. In some arrangements, the power failure signal 38 is a power supply signal from the primary power source 26 or from the secondary power source 28. In other arrangements, the power failure signal 38 is a separate signal, e.g., from a sensor connected to the main power feed.

The storage processing circuitry 30 includes a controller 40, a volatile-memory storage cache 42 (a data storage cache between 100 MB to 1 GB), a flash-based memory vault 44, a clock generator circuit 46, and isolation circuitry 48. While the controller 40 is being powered by the primary power source 28, the controller 40 performs data storage operations on behalf of the set of hosts 22 using the volatile-memory storage cache 42 and the set of magnetic disk drives 32. For example, when a host 22 sends the controller 40 a request to write data, the controller 40 stores the data in volatile memory 42 and then, in parallel to scheduling the data to be written to the magnetic disk drives 32, conveys the completion of the write data request to the host 22. As a result, the write request completes to the host 22 as soon as the data is written to the volatile-memory storage cache 42 which takes less time than writing the magnetic disk drives 32.

Now, suppose that the controller 40 receives the power failure signal 38 indicating that the controller 40 is now being powered by the secondary power source 28 rather than by the primary power source 26. In this situation, primary power 34 from the primary power source 26 is no longer available but backup power 36 from the secondary power source 28 is available at least temporarily. Accordingly, the controller 40 remains operational and moves data from the volatile-memory storage cache 42 to the flash-based memory vault 44 in response to the power failure signal 38. The amount of power necessary to move the data from the volatile-memory storage cache 42 to the flash-based memory vault 44 is significantly less than that which would be required to write that data out to a vault on the set of magnetic disk drives 32 since flash-based memory (which has no motors or actuators to operate) requires relatively little power to store data.

When the primary power source 26 becomes available again, the storage processing circuitry 30 receives primary power 34 and no longer receives the power failure signal 38. In some arrangements, the omission of the power failure signal 38 (or the de-asserted state of the power failure signal 38) is essentially a power normal signal indicating that the storage processing circuitry 30 is running off of primary power 34. At this point, the controller 40 restores the contents of volatile-memory storage cache 42. In particular, the controller 40 moves the data from the flash-based memory vault 44 back into the volatile-memory storage cache 42 thus enabling the storage processing circuitry 30 to resume data storage operations where it left off, e.g., the storage processing circuitry 30 is now capable of properly de-staging the data in the volatile-memory storage cache 42 to the set of magnetic disk drives 32 as well as performing new data storage operations on behalf of the set of hosts 22 in a normal manner.

It should be understood that, in contrast to conventional data storage systems which store data from storage caches into magnetic disk drive storage vaults in response to power failures, there is no need to run the set of magnetic disk drives 32 of the data storage system 20. Rather, the set of magnetic disk drives 32 is allowed to deactivate in response to loss of primary power 34 from the primary power source 26 since the controller 40 transfers data from the volatile-memory storage cache 42 to the flash-based memory vault 44 for safe keeping. Thus, data within the volatile-memory storage cache 42, which has not yet been de-staged, is not lost.

It should be further understood that other components within the storage processing circuitry 30 enable enhanced operation in the event of a power failure. For example, the clock generator circuit 46 and the isolation circuitry 48 are configured to perform certain duties during a loss of primary power 34 from the primary power source 26.

In connection with the clock generator circuit 46, the clock generator 46 is configured to provide a relatively-fast clock signal (or multiple clock signals) to the processing circuitry of the controller 40 during normal operation when the controller 40 is performing data storage operations on behalf of the set of hosts 22. In some arrangements, a microprocessor of the controller 40 runs within a range of 50 to 100 Watts when operating at this normal operating clock speed.

However, if there is a loss of primary power 34, the clock generator 46 is configured to provide a significantly slower clock signal to the processing circuitry of the controller 40 while the controller 40 moves data from the volatile-memory storage cache 42 to the flash-based memory vault 44. In some arrangements, the microprocessor of the controller 40 runs at less than 30 Watts (e.g., substantially within a range of 15 to 20 Watts) when operating at this reduced clock speed. As a result, less power is consumed thus enabling the use of a smaller-sized backup power source 28 (e.g., a relatively small battery).

In connection with the isolation circuitry 48, it should be understood that various components of the data storage system 20 form a processing core 50. In some arrangements, the controller 40, the volatile-memory storage cache 42 and the flash-based memory vault 44 (perhaps among other components) form this core 50. During normal operation, primary power 34 from the primary power source 26 reaches all of the components of the data storage system 20 (e.g., the set of magnetic disk drives 32). However, during a loss of the primary power 34 and a switch to backup power 36 from the secondary power source 28, the isolation circuitry 48 is configured to electrically isolate the processing core 50 from the other areas of the data storage system 20 (e.g., the set of magnetic disk drives 32) so that only the processing core 50 receives the backup power 36. Accordingly, the backup power 36 is not wasted by unnecessarily powering the non-vital areas of the data storage system 20 and only reaches the vital areas thus enabling the controller 40 to dump the contents of the volatile-memory storage cache 42 into the flash-based memory vault 44. Such electrical isolation conserves backup power by removing interference, i.e., power consumption by circuits of the data storage system 20 which are non-essential during the loss of primary power such as the set of magnetic disk drives 32. Further details will now be provided with reference to FIG. 2.

Figure 2:
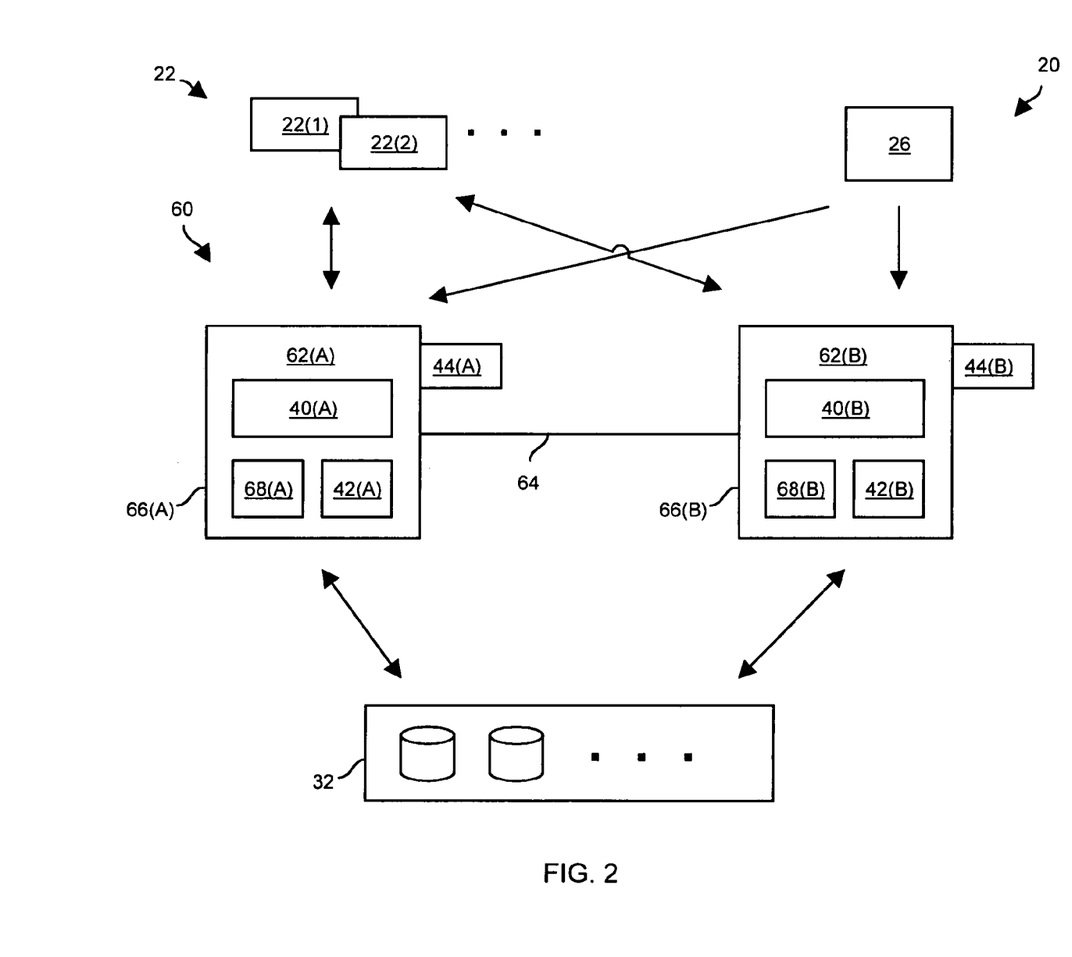
FIG. 2 is a diagram of the data storage system of FIG. 1 in a multiple storage processor context.

FIG. 2 is a diagram of the data storage system 20 in the context of a dual storage processor configuration 60. Here, the data storage system 20 includes a first storage processor 62(A), a second storage processor 62(B) and a high-speed bus 64 which interconnects the first and second storage processors 62(A), 62(B) (collectively, storage processors 62). The storage processor 62(A) includes, among other things, an enclosure 66(A) which contains a controller 40(A), a volatile-memory storage cache 42(A), and a flash-based memory vault 44(A). Within the enclosure 66(A) also resides a battery 68(A) which forms a portion of the secondary power source 28 (also see FIG. 1).

Similarly, the storage processor 62(B) includes, among other things, an enclosure 66(B) which contains a controller 40(B), a volatile-memory storage cache 42(B), and a flash-based memory vault 44(B). Within the enclosure 66(B) also resides a battery 68(B) which forms another portion of the secondary power source 28 (again, also see FIG. 1).

Each storage processor 62 sends communications 70 to the other storage processor 62 through the bus 64. In particular, each storage processor 62 is capable of providing status to the other storage processor 62 through the bus 64 (e.g., an indication of whether it is running in a normal operating mode or whether it has switched from the normal operating mode to a data vaulting mode). Additionally, the storage processors 62 exchange data through the bus 64 thus enabling the storage processors 62 to mirror the contents of the volatile-memory storage caches 42(A), 42(B). Accordingly, the volatile-memory storage caches 42(A), 42(B) can be viewed as forming the volatile-memory storage cache 42 of FIG. 1, and the flash-based memory vaults 44(A), 44(B) can be viewed as forming the flash-based memory vault 44 of FIG. 1. Further details will now be provided with reference to FIG. 3.

Figure 3:
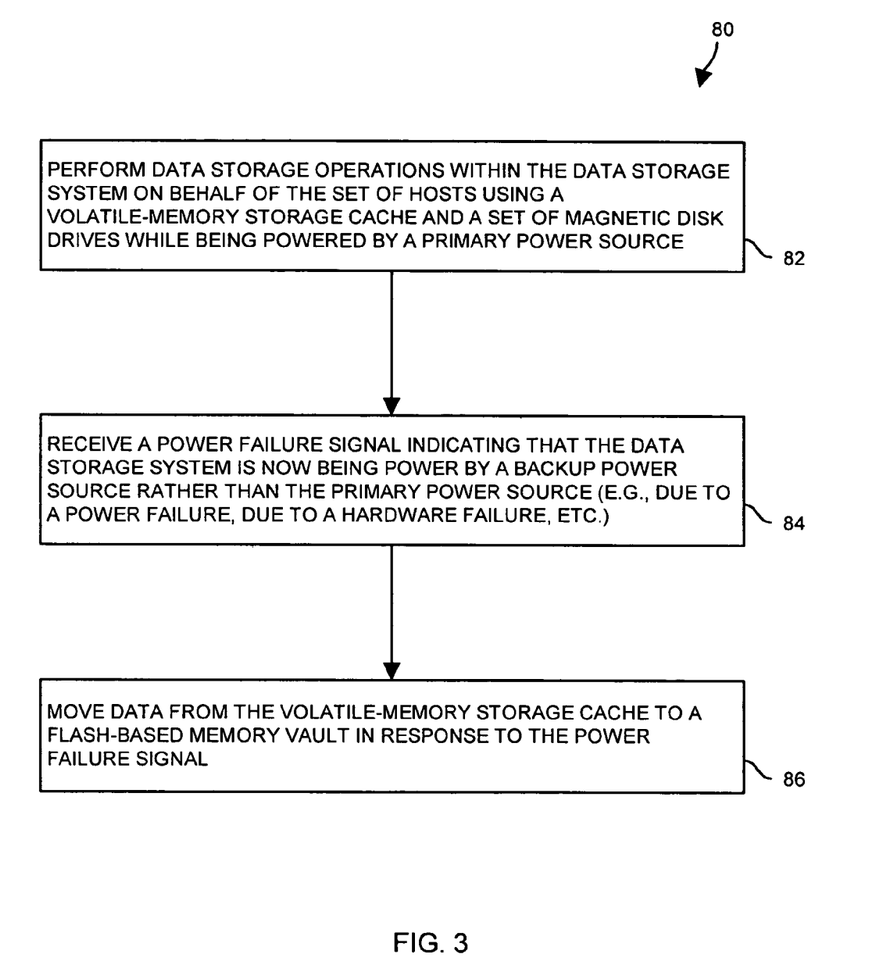
FIG. 3 is a flowchart of a procedure performed by the data storage system of FIGS. 1 and 2.

FIG. 3 is a flowchart of a procedure 80 for managing data within the data storage system 20 during a power failure event. In step 82, the controller 40 performs data storage operations on behalf of the set of hosts 22 using the volatile-memory storage cache 42 and the set of magnetic disk drives 44 while the data storage system 20 is being powered by the primary power source 26 (also see FIG. 1).

In step 84, the controller 40 receives the power failure signal 38 indicating that the data storage system 20 is now being powered by the backup power source 28 rather than by the primary power source 26. Accordingly, a power failure event has occurred. For example, the data storage system 20 may lose access to a main power feed (e.g., power from the street). As another example, the primary power source 26 may suffer a hardware failure.

In step 86, the controller 40 moves data from the volatile-memory storage cache 42 to the flash-based memory vault 44 in response to the power failure signal 38. In view of certain electrical behaviors of flash-memories, a significant amount of data is capable of being written to flash memory in a relatively short period of time (e.g., a data storage rate of 12 MB/second).

It should be understood that, once the data is written to flash memory, the data is capable of residing on the flash memory indefinitely. As will be explained in further detail momentarily, this feature provides flexibility when restoring data storage system operations. Furthermore, in contrast to conventional data storage systems which require external UPS's and external cabling, the backup power supplies for the data storage system 20 can be relatively small (e.g., see the batteries 68 in FIG. 2) and there is no external cabling necessary thus making the above-described technique an attractive, simple and low cost mechanism for managing data during a power failure event.

It should be further understood that, in the context of a dual storage processor configuration 60 (also see FIG. 2), the controller 40 of each storage processor 62 preferably moves the contents of the volatile-memory storage caches 42 of that storage processor 62 to the flash-based memory vault 44 of that storage processor 62. That is, the storage processor 62(A) is configured to transfer the contents of the volatile-memory storage cache 42(A) to the flash-based memory vault 44(A) and, concurrently the storage processor 62(B) is configured to transfer the contents of the volatile-memory storage cache 42(B) to the flash-based memory vault 44(B). This contemporaneous operation is superior to the operation of conventional data storage systems where only one of a pair of storage processors writes the contents of its storage cache out to the magnetic disk drive vault on an array of magnetic disk drives. Further details will now be provided with reference to FIG. 4.

Figure 4:
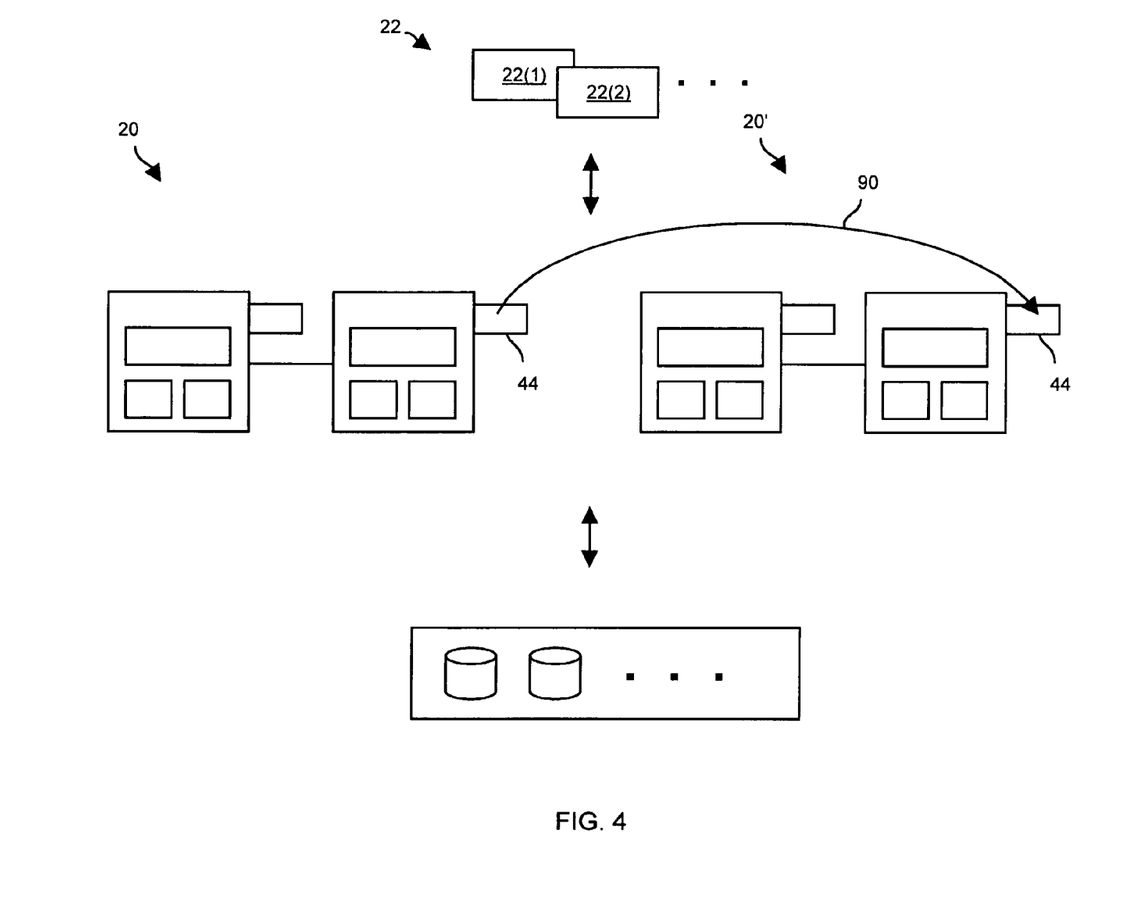
FIG. 4 is a block diagram illustrating a particular use of the flash-based memory vault of FIG. 2.

FIG. 4 illustrates a recovery procedure which is easily accomplished through use of the flash-based memory vault 44. In particular, in some arrangements, the flash-based memory vault 44 is configured as a removable module that conveniently connects to and disconnects from other portions of the data storage system 20 through module connectors, e.g., in a manner similar to attaching and detaching a common memory stick to a general purpose computer through a USB port, in a manner similar to connecting a daughter card to and disconnecting the daughter card from a motherboard, and so on.

Moreover, in the situation of a dual storage processor configuration 60 such as that shown in FIG. 2, it should be understood that either flash-based memory vault 44(A), 44(B) contains the entire storage cache contents since the volatile-memory storage caches 42(A), 42(B) mirror each other. As such, only one flash-based memory vault 44(A), 44(B) is necessary to restore the storage cache state of the data storage system 20.

Accordingly, in the event of a hardware failure after safely storing the contents of the volatile-memory storage cache 42 into the flash-based memory vault 44, the flash-based memory vault 44 is then capable of being disconnected from the data storage system 20 and connected to new storage processing hardware (e.g., a new data storage system 20'), as generally shown by the arrow 90 in FIG. 4. The contents of the flash-based memory vault 44 are then capable of being restored onto each volatile-memory storage cache 42(A), 42(B) of the new hardware (e.g., mirrored through the bus 64 of the new data storage system 20', also see FIG. 2) thus enabling the new storage processing hardware to continue to perform data storage operations on behalf of the set of hosts 22. Under this situation, there is no loss of data. Further details will now be provided with reference to FIG. 5.

Figure 5:
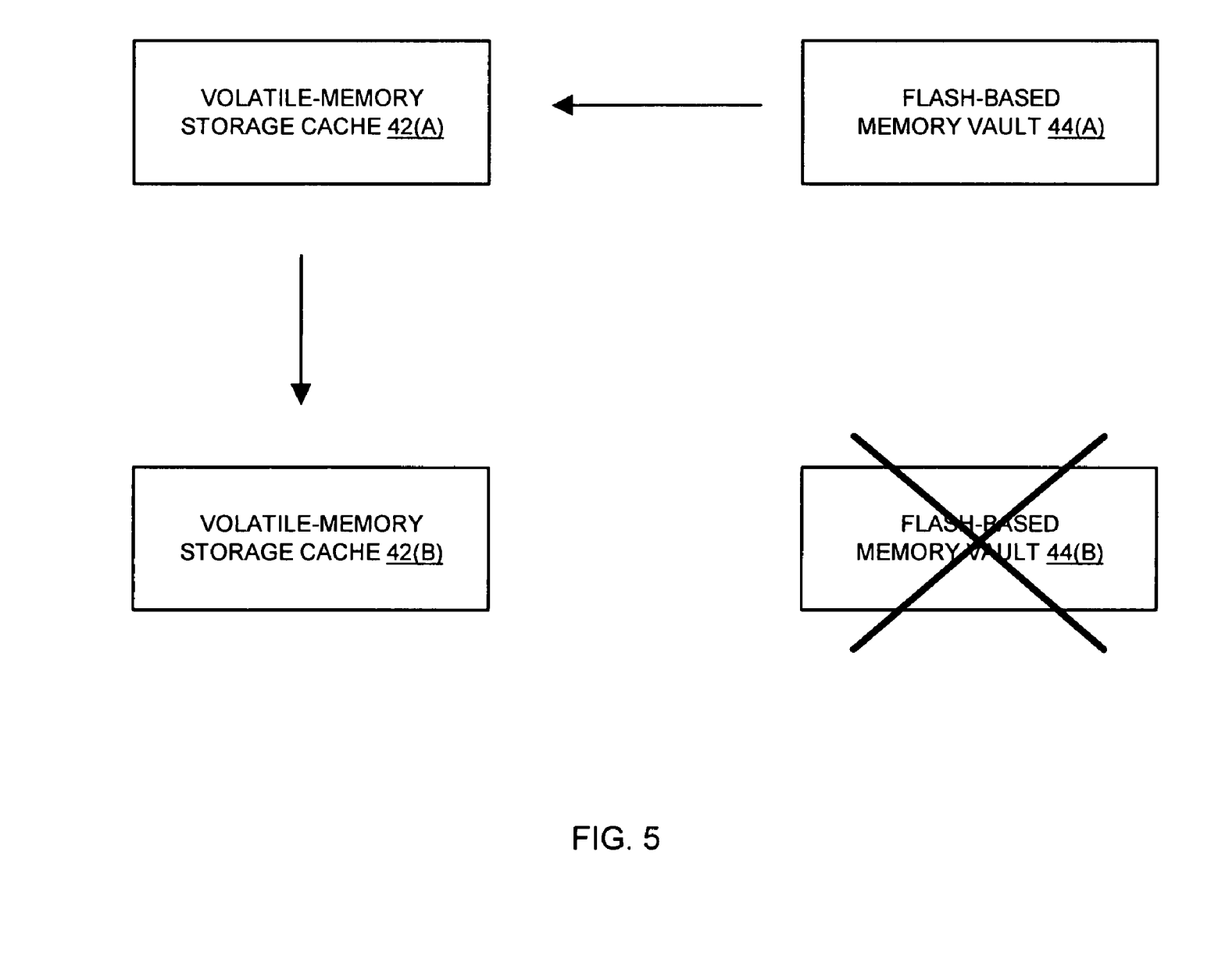
FIG. 5 is a block diagram of a first technique for restoring contents of the flash-based memory vault of FIG. 2 to a storage cache.

FIG. 5 is a block diagram of a first technique for restoring contents of the flash-based memory vault 44 to the volatile-memory storage cache 42 in the context of a dual storage processor configuration 60 (also see FIG. 2). Recall that the flash-based memory vaults 44(A), 44(B) (FIG. 2) form the flash-based memory vault 44 (FIG. 1), and that each flash-based memory vault 44(A), 44(B) is configured to contain the same up-to-date information since the volatile-memory storage caches 42(A), 42(B) mirror each other. Whether both volatile-memory storage caches 42(A), 42(B) contain the same current data can be confirmed by a check of time information on the flash-based memory vaults 44(A), 44(B) (e.g., by comparing the output of generation counters, by comparing timestamps, etc.).

If it turns out that one flash-based memory vault 44 contains more recent information, the contents of both volatile-memory storage caches 42(A), 42(B) can be restored from that flash-based memory vault 44. Otherwise, it does not matter which flash-based memory vault 44 provides the data during data restoration.

Figure 6:
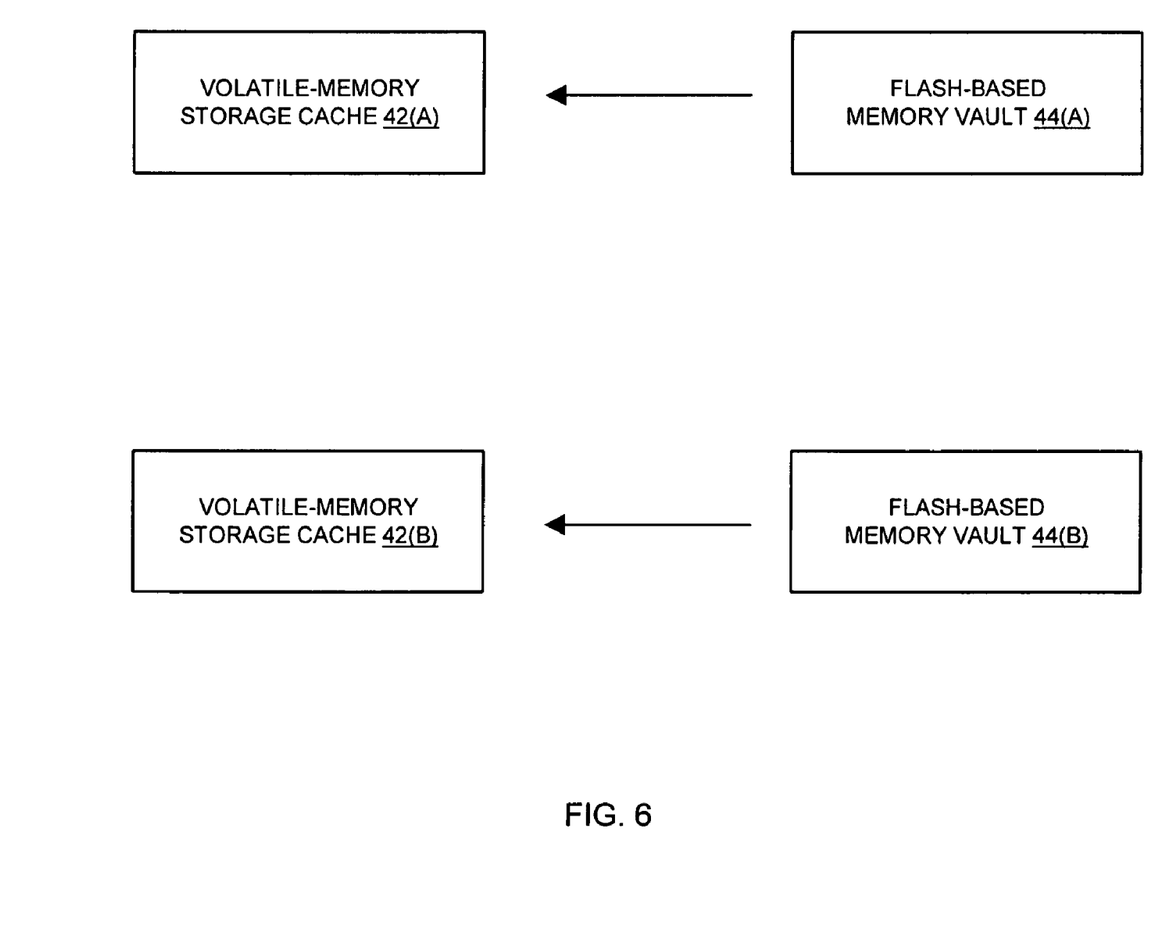
FIG. 6 is a block diagram of a second technique for restoring contents of the flash-based memory vault of FIG. 2 to a storage cache.
Figure 7:
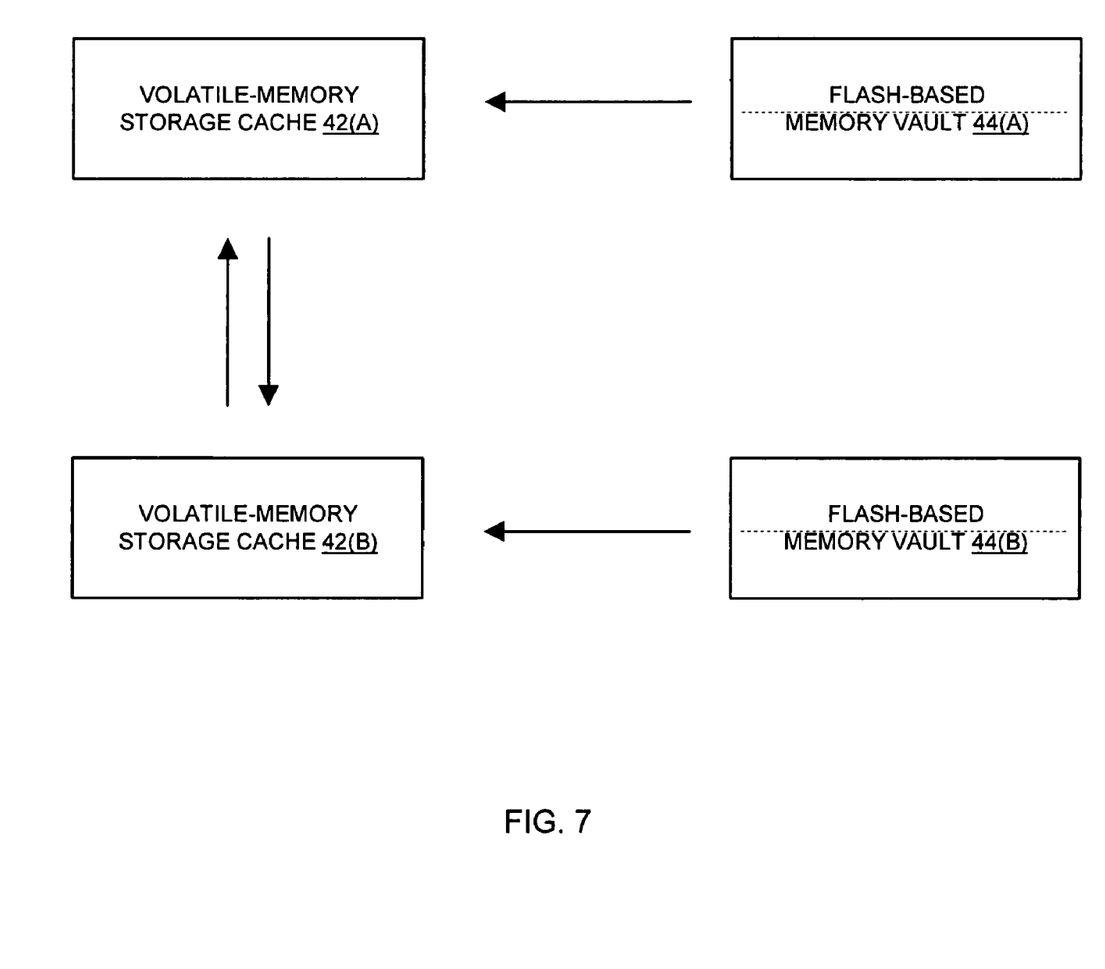
FIG. 7 is a block diagram of a third technique for restoring contents of the flash-based memory vault of FIG. 2 to a storage cache.

As shown in FIG. 5, in accordance with the first technique, the restoration transfer occurs in a two step process. In particular, one of the flash-based memory vaults 44(A), 44(B) (e.g., the flash-based memory vault 44(A)) provides the data to its respective volatile-memory storage cache 42(A), 42(B) directly (e.g., the volatile-memory storage cache 42(A)). Then, the data is copied through the bus 64 to the other volatile-memory storage cache 42 (e.g., the volatile-memory storage cache 42(A)). At completion, the data is mirrored by both volatile-memory storage caches 42(A), 42(B). FIGS. 6 and 7 show alternative restoration techniques which are available if the flash-based memory vaults 44(A), 44(B) contain the same information.

FIG. 6 is a block diagram of a second technique for restoring contents of the flash-based memory vault 44 to the volatile-memory storage cache 42 in the context of a dual storage processor configuration 60 (also see FIG. 2). Here, the controller 40(A) (also see FIG. 2) restores the contents of flash-based memory vault 44(A) into the volatile-memory storage cache 42(A). Simultaneously, the controller 40(B) (also see FIG. 2) restores the contents of flash-based memory vault 44(B) into the volatile-memory storage cache 42(B).

It should be understood that the restoration technique illustrated in FIG. 6 provides an additional level of thoroughness. In particular, once the contents of the volatile-memory storage caches 42(A), 42(B) are restored, the controllers 40 can perform further tasks to guarantee accuracy of the data, e.g., a comparison of the contents of the volatile-memory storage caches 42(A), 42(B).

FIG. 7 is a block diagram of a third technique for restoring contents of the flash-based memory vault 44 to the volatile-memory storage cache 42 in the context of a dual storage processor configuration 60 (also see FIG. 2). Under this third technique, the controller 40(A) (also see FIG. 2) restores half of the contents of flash-based memory vault 44(A) into the volatile-memory storage cache 42(A) (e.g., an upper half of the address space). Simultaneously, the controller 40(B) (also see FIG. 2) restores an opposite half of the contents of flash-based memory vault 44(B) into the volatile-memory storage cache 42(B) (e.g., a lower half of the address space). Next, the controllers 40 exchange their restored contents with each other through the bus 64 (also see FIG. 2) so that each volatile-memory storage cache 42 is completely restored (e.g., the upper half is copied from the volatile-memory storage cache 42(A) to the volatile-memory storage cache 42(B), and the lower half is copied from the volatile-memory storage cache 42(B) to the volatile-memory storage cache 42(A)).

It should be understood that the restoration technique illustrated in FIG. 7 provides a faster restoration time since the data transfer rate between the volatile-memory storage caches 42(A), 42(B) (e.g., the bandwidth of the bus 64, also see FIG. 2) is faster than the data transfer rate between the flash-based memory vaults 44 and the volatile-memory storage caches 42. Accordingly, this third technique is well-suited for situations in which recovery time must be kept to a minimum.

As mentioned above, an improved technique involves moving data within a data storage system 20 from a storage cache 42 into a flash-based memory vault 44 in response to a power failure signal 38. Such operation alleviates the need to provide backup power to magnetic disk drives 32. Rather, data can be moved from the storage cache 42 to the flash-based memory vault 44 using a relatively-small backup power source 28, e.g., a battery that only powers storage processing circuitry 30. Without the need for backup power to the magnetic disk drives 32, there is no burden of having to provide large, costly and complex backup power supplies and the associated external cabling for magnetic disk drives. That is, the magnetic disk drives 32 can simply turn off as soon as the primary power source 26 is lost. With the storage processing circuitry 30 still running from a backup power source (e.g., a dedicated battery), the storage processing circuitry 30 is capable of moving the contents of the storage cache 42 to the flash-based memory vault 44 thus preserving data integrity of the data storage system 20 so that no data is ever lost.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A data storage system, comprising:
    a volatile-memory storage cache;
    a flash-based memory vault;
    a controller coupled to the volatile-memory storage cache and the flash-based memory vault, the controller being configured to:
        while the controller is being powered by a primary power source, perform data storage operations on behalf of a set of hosts using the volatile-memory storage cache and a set of magnetic disk drives,
        receive a power failure signal indicating that the controller is now being powered by a backup power source rather than by the primary power source, and
        move data from the volatile-memory storage cache to a flash-based memory vault in response to the power failure signal,
    a first storage processor having a first storage cache and a first memory vault;
    a second storage processor having a second storage cache and a second memory vault, the first and second storage caches being configured to mirror data, the first and second storage caches forming the volatile-memory storage cache of the data storage system, the first and second memory vaults forming the flash-based memory vault; and
    wherein the controller, when moving the data from the volatile-memory storage cache to the flash-based memory vault, is configured to:
        store contents of the first storage cache to the first memory vault, and
        store contents of the second storage cache to the second memory vault; and wherein the controller is further configured to:
receive a power normal signal,
restore the first and second storage caches from the first and second memory vaults which form the flash-based memory vault in response to the power normal signal, the first and second storage caches mirroring each other once the first and second storage caches have been restored,
when restoring the first and second storage caches, transfer a top portion of the contents of the first storage cache stored in the first memory vault back to the first storage cache without transferring a bottom portion of the contents of the first storage cache store in the first memory vault,
when restoring the first and second storage caches, transfer a bottom portion of the contents of the second storage cache stored in the second memory vault back to the second storage cache without transferring a top portion of the contents of the second storage cache store in the second memory vault,
when restoring the first and second storage caches, copy the bottom portion of the contents transferred back to the second storage cache from the second storage cache to the first storage cache, and
when restoring the first and second storage caches, copy the top portion of the contents transferred back to the first storage cache from the first storage cache to the second storage cache.

2. A data storage system as in claim 1 wherein the controller includes processing circuitry which is configured to consume power (i) at a first power consumption rate when running at a first clock speed and (ii) at a second power consumption rate when running at a second clock speed, the second power consumption rate being lower than the first power consumption rate, and the second clock speed being slower than the first clock speed;
wherein the controller, when performing the data storage operations, is configured to run the processing circuitry at the first clock speed; and
wherein the controller, when moving the data from the volatile-memory storage cache to the flash-based memory vault, is configured to run the processing circuitry at the second clock speed to conserve power from the backup power source while the processing circuitry moves the data from the volatile-memory storage cache to the flash-based memory vault.

3. A data storage system as in claim 2 wherein the controller, when running the processing circuitry at the first clock speed, is configured to operate a microprocessor of the processing circuitry within a first power range which is between 50 Watts and 100 Watts; and
wherein running the processing circuitry at the second clock speed includes operating the microprocessor of the processing circuitry within a second power range which is less than 30 Watts.

4. A data storage system as in claim 1 wherein (i) the volatile-memory storage cache, (ii) the flash-based memory vault and (iii) the controller configured to perform data storage operations reside within a processing core of the data storage system; and wherein the data storage system further comprises:
isolation circuitry configured to electrically isolate the processing core from other portions of the data storage system in response to the power failure signal to enable the controller to move the data from the volatile-memory storage cache to the flash-based memory vault without interference from the other portions of the data storage system.

5. A data storage system as in claim 1 wherein the flash-based memory vault is configured as a removable module to enable a user to
disconnect the flash-based memory vault from the data storage system,
connect the flash-based memory vault to a new data storage system, and
restore the data from the flash-based memory vault to a new volatile-memory storage cache of the new data storage system to continue to perform data storage operations on behalf of the set of hosts.

6. A data storage system as in claim 1 wherein the controller is further configured to:
receive a power normal signal; and
restore the data from the flash-based memory vault to the volatile-memory storage cache in response to the power normal signal.

7. A data storage system as in claim 1 wherein the first memory vault is directly connected uniquely to the first storage cache, and the second memory vault is directly connected uniquely to the second storage cache.

8. A method for managing data within a data storage system, the method comprising:
while the data storage system is being powered by a primary power source, performing data storage operations on behalf of a set of hosts using a volatile-memory storage cache and a set of magnetic disk drives;
receiving a power failure signal indicating that the data storage system is now being powered by a backup power source rather than by the primary power source;
moving data from the volatile-memory storage cache of the data storage system to a flash-based memory vault of the data storage system in response to the power failure signal;
wherein the data storage system includes:
a first storage processor having a first storage cache and a first memory vault, and
a second storage processor having a second storage cache and a second memory vault, the first and second storage caches being configured to mirror data, the first and second storage caches forming the volatile-memory storage cache of the data storage system, the first and second memory vaults forming the flash-based memory vault; and
wherein moving the data from the volatile-memory storage cache to the flash-based memory vault includes:
storing contents of the first storage cache to the first memory vault, and
storing contents of the second storage cache to the second memory vault; and
receiving a power normal signal;
restoring the first and second storage caches from the first and second memory vaults which form the flash-based memory vault in response to the power normal signal, the first and second storage caches mirroring each other once the first and second storage caches have been restored;
wherein restoring the first and second storage caches includes transferring a top portion of the contents of the first storage cache stored in the first memory vault back to the first storage cache without transferring a bottom portion of the contents of the first storage cache store in the first memory vault;

wherein restoring the first and second storage caches includes transferring a bottom portion of the contents of the second storage cache stored in the second memory vault back to the second storage cache without transferring a top portion of the contents of the second storage cache store in the second memory vault;

wherein restoring the first and second storage caches includes copying the bottom portion of the contents transferred back to the second storage cache from the second storage cache to the first storage cache; and wherein restoring the first and second storage caches includes copying the top portion of the contents transferred back to the first storage cache from the first storage cache to the second storage cache.

9. A method as in claim 8 wherein a controller which performs the data storage operations includes processing circuitry that is configured to consume power (i) at a first power consumption rate when running at a first clock speed and (ii) at a second power consumption rate when running at a second clock speed, the second power consumption rate being lower than the first power consumption rate, and the second clock speed being slower than the first clock speed;

wherein performing the data storage operations includes running the processing circuitry at the first clock speed; and wherein moving the data from the volatile-memory storage cache to the flash-based memory vault includes running the processing circuitry at the second clock speed to conserve power from the backup power source while the processing circuitry moves the data from the volatile-memory storage cache to the flash-based memory vault.

10. A method as in claim 9 wherein running the processing circuitry at the first clock speed includes operating a microprocessor of the processing circuitry within a first power range which is between 50 Watts and 100 Watts; and wherein running the processing circuitry at the second clock speed includes operating the microprocessor of the processing circuitry within a second power range which is less than 30 Watts.

11. A method as in claim 8 wherein (i) the volatile-memory storage cache, (ii) the flash-based memory vault and (iii) a controller configured to perform data storage operations reside within a processing core of the data storage system; and wherein the method further comprises:

electrically isolating the processing core from other portions of the data storage system in response to the power failure signal to enable the controller to move the data from the volatile-memory storage cache to the flash-based memory vault without interference from the other portions of the data storage system.

12. A method as in claim 8, further comprising:

disconnecting the flash-based memory vault from the data storage system;

connecting the flash-based memory vault to a new data storage system; and restoring the data from the flash-based memory vault to a new volatile-memory storage cache of the new data storage system to continue to perform data storage operations on behalf of the set of hosts.

13. A method as in claim 8, further comprising:

receiving a power normal signal; and restoring the data from the flash-based memory vault to the volatile-memory storage cache in response to the power normal signal.

14. A method as in claim 8 wherein the first memory vault is directly connected uniquely to the first storage cache, and the second memory vault is directly connected uniquely to the second storage cache.

15. A data storage system, comprising:

a volatile-memory storage cache;

a flash-based memory vault; and a controller coupled to the volatile-memory storage cache and the flash-based memory vault, the controller including:

means for performing data storage operations on behalf of a set of hosts using the volatile-memory storage cache and a set of magnetic disk drives while the controller is being powered by a primary power source, means for receiving a power failure signal indicating that the controller is now being powered by a backup power source rather than by the primary power source, and means for moving data from the volatile-memory storage cache to a flash-based memory vault in response to the power failure signal;

a first storage processor having a first storage cache and a first memory vault;

a second storage processor having a second storage cache and a second memory vault, the first and second storage caches being configured to mirror data, the first and second storage caches forming the volatile-memory storage cache of the data storage system, the first and second memory vaults forming the flash-based memory vault; and wherein the controller, when moving the data from the volatile-memory storage cache to the flash-based memory vault, is configured to:

store contents of the first storage cache to the first memory vault, and store contents of the second storage cache to the second memory vault; and wherein the controller is further configured to:

receive a power normal signal, restore the first and second storage caches from the first and second memory vaults which form the flash-based memory vault in response to the power normal signal, the first and second storage caches mirroring each other once the first and second storage caches have been restored, when restoring the first and second storage caches, transfer a top portion of the contents of the first storage cache stored in the first memory vault back to the first storage cache without transferring a bottom portion of the contents of the first storage cache store in the first memory vault, when restoring the first and second storage caches, transfer a bottom portion of the contents of the second storage cache stored in the second memory vault back to the second storage cache without transferring a top portion of the contents of the second storage cache store in the second memory vault, when restoring the first and second storage caches, copy the bottom portion of the contents transferred back to the second storage cache from the second storage cache to the first storage cache, and when restoring the first and second storage caches, copy the top portion of the contents transferred back to the first storage cache from the first storage cache to the second storage cache.

* * * * *